United States Patent [19]
Ryba

[11] 3,749,519
[45] July 31, 1973

[54] FAN, PARTICULARLY FOR COOLING SYSTEMS IN MOTOR VEHICLES

[76] Inventor: Anton Ryba, Freiheitsstrasse 57/21, Bozen, Italy

[22] Filed: Mar. 9, 1971

[21] Appl. No.: 122,372

[30] Foreign Application Priority Data
Mar. 12, 1970 Austria .............................. 2309/70

[52] U.S. Cl. ............... 416/241, 416/244, 416/95
[51] Int. Cl. ...................................... F04d 29/34
[58] Field of Search .............. 416/229, 230, 241 A, 416/244, 95, 204; 123/41.11, 41.49

[56] References Cited
UNITED STATES PATENTS

| | | |
|---|---|---|
| 3,241,493 | 3/1966 | Frey .................. 416/241 X |
| 3,260,312 | 7/1966 | Elmer ................. 416/241 X |
| 2,836,348 | 5/1958 | McDonald ............. 416/95 |
| 3,332,500 | 7/1967 | Bristol et al. ........ 416/224 UX |
| 3,408,944 | 11/1968 | Belonger et al. ....... 416/241 A |
| 3,622,249 | 11/1971 | Hayashi ............... 416/244 X |
| 3,659,471 | 5/1972 | Marsch ................ 123/41.11 |

FOREIGN PATENTS OR APPLICATIONS

| | | |
|---|---|---|
| 1,327,385 | 4/1963 | France ................ 416/241 A |
| 733,578 | 7/1955 | Great Britain ......... 416/241 A |
| 667,276 | 6/1929 | France ................ 416/95 |
| 1,234,570 | 5/1960 | France ................ 416/241 A |

*Primary Examiner*—Everette A. Powell, Jr.
*Attorney*—Woodhams, Blanchard & Flynn

[57] ABSTRACT

A fan, particularly for cooling systems in motor vehicles, wherein the fan hub consists of outer and inner hub parts which are inserted one within the other and fastened together. The outer hub part carries the fan blades and the inner hub part, which may optionally be composed of two or more segments, is provided with the device for connection to the clutch and being made of a nonmetallic material having greater resistance to heat than the material of which the outer hub part carrying the fan blades is made.

3 Claims, 2 Drawing Figures

PATENTED JUL 31 1973  3,749,519
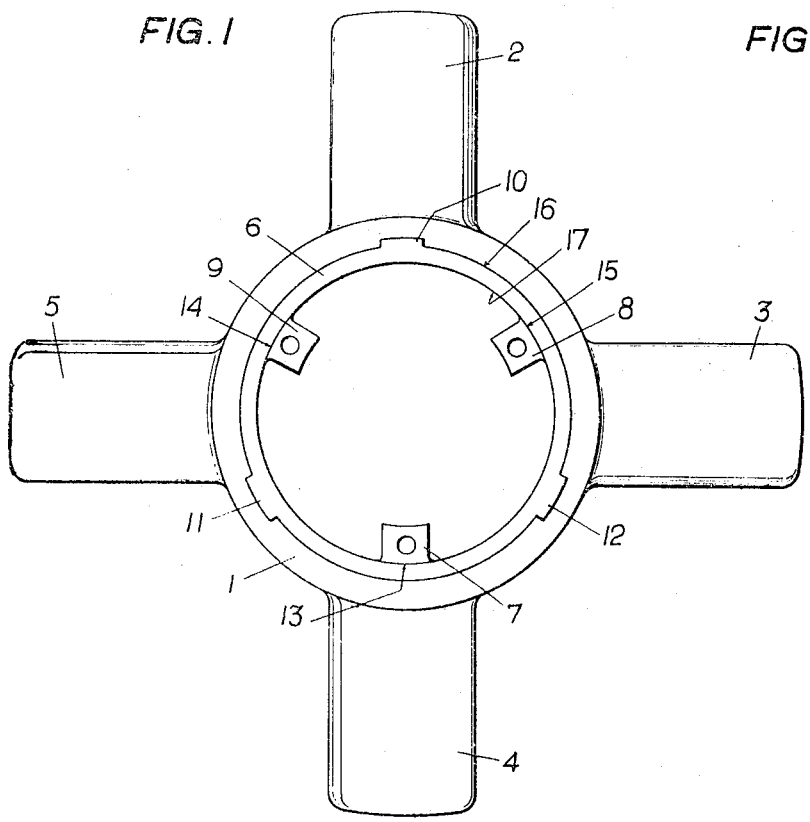
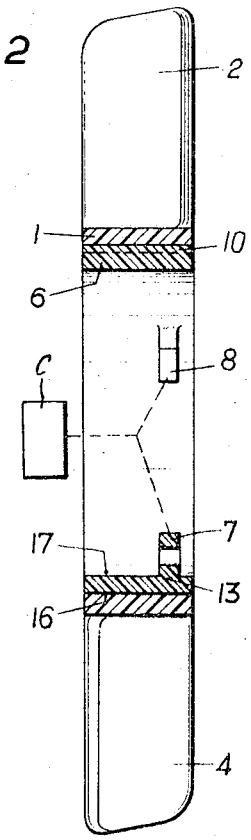
INVENTOR
ANTON RYBA
BY
Woodhams Blanchard & Flynn
ATTORNEYS

FAN, PARTICULARLY FOR COOLING SYSTEMS IN MOTOR VEHICLES

FIELD OF THE INVENTION

This invention relates to a fan construction and, more particularly relates to a fan construction for cooling systems in motor vehicles.

BACKGROUND OF THE INVENTION

Fans made of thermoplastic materials have given good results for the cooling systems of motor vehicles; they are capable of good aerodynamic conformation and are relatively inexpensive to manufacture. A disadvantage of the plastics materials used for such fans is however their relatively great sensitivity to heat, so that operating temperatures higher than 80°–100°C can scarcely be permitted for the inexpensive types. As long as the fans are directly connected to the drive shaft, their resistance to heat is still just sufficient to comply with the required operating conditions.

Since a fan is needed only in about 20 percent of the total driving range, since the ram effect is sufficient by itself at higher speeds of travel, there is an increasing tendency to connect the fan to the drive shaft by means of a slipping clutch, particularly a fluid friction clutch, and thus to limit its rotational speed at higher engine speeds.

If the fan is now connected to the drive shaft by a slipping clutch, there is thus available a drive system which has a branched energy flux and in which the driving power for the fan is converted into mechanical work and the slipping power into heat (kcal). Since this slipping power occurs continuously during the operation of the vehicle, the heat produced in this manner is considerable. If in addition it is considered that very high temperatures occur in any case in the engine compartment of the vehicle, it will readily be understood that operating temperatures above 150°C are possible for the slipping clutch. While these clutches can withstand such thermal loads, this is not immediately the case for fans of thermoplastic materials, since in the case of plastics materials having inadequate resistance to heat the connections to the metallic parts begin to melt.

If therefore it is desired to retain the advantages of the inexpensive and highly suitable plastics material for the greater part of the fan, care must be taken that a plastics material having greater resistance to heat or a non-metallic material having greater resistance to heat is used at the connections to the metal parts.

The present invention now solves this problem through the fact that the hub of the fan consists of an outer part and an inner part, which are inserted one in the other and joined fast together the outer hub part carrying the fan blades and the inner hub part, which may optionally consist of two or more segments, is equipped with the device for connection to the clutch and is made of a nonmetallic material which has greater resistance to heat than the material of which the outer hub part carrying the fan blades is made.

As an example of embodiment of the invention the drawing illustrates a fan of this kind, FIG. 1 being an elevation and

FIG. 2 a section.

DETAILED DESCRIPTION

The outer hub part 1 carrying the blades 2, 3, 4 and 5 is made in known manner in one piece of thermoplastic material, which may be a plastics material having lower resistance to heat, such as for example polypropylene. To the outer hub part 1 there is connected an inner hub part 6, which is also provided with the fastening lugs 7, 8, 9 and is made of a thermoplastic material having greater resistance to heat, such as for example teflon, hostaflon, polyamide, or the like, or of a hardenable plastics material, that is to say a so-called thermosetting plastics material, such as for example bakelite, silicone, or the like. Many such materials, mixed with the most diverse additives, such as for example glass, asbestos, and cellulose fibers, ground minerals, Kieselguhr, and the like, are known in practice and need not here be listed in greater detail.

The two hub parts 1 and 6 can be joined together by injection molding, adhesive bonding, or in some other suitable manner. The parts 1 and 6 may for example be secured against rotation by means of projections 10, 11, and 12. The part 6 possessing greater resistance to heat, which is inserted into the part 1 of the fan having poorer resistance to heat, is joined to the metal connecting parts of the clutch C (FIG. 2). The inner hub part may also be composed of two or more ring segments which are joined in suitable manner to the outer hub part.

If for example heat now flows from the metal connecting parts of the clutch C to the fastening lugs 7, 8, 9 of the inner hub part 6, only very little heat is transmitted because of the very low thermal conductivity of the plastics material, even if the temperature of these connecting parts is relatively high. Since the transfer cross-sections 13, 14 and 15 of the lugs 7, 8 and 9 are also small in relation to the surfaces 16 and 17 of the inner hub part 6, the amount of heat which is transferred through the lugs 7, 8, 9 and passes through the lug cross-sections 13, 14 and 15 is rapidly dispersed by the surfaces 16 and 17 and accumulations of heat can therefore not occur, that is to say the inner hub part 6 cannot assume a temperature which could be harmful to the outer hub part 1. In general this certainty is achieved if the surfaces 16 and 17 of the inner hub part 6 are large in relation to the lug cross-sections 13, 14 and 15 of the fastening lugs 7, 8 and 9.

It is naturally possible for any desired number of fan blades to be used; the shape of the hubs and hub parts is also not restricted to that illustrated here and all shapes and constructions serving the purpose of the present invention come within the scope of the latter. In particular, very many variations are also possible in respect of the pairing of the various materials, all of which variations come within the scope of the invention if the selection and arrangement are such that the inner hub part carrying the parts connected to the clutch is made of plastics material having greater resistance to heat than the outer hub part carrying the fan blades.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Fan blade apparatus, comprising:

a first hollow outer hub part having a plurality of fan blades fixed thereto;

a nonmetallic, second inner hub part insertable onto said first hub part;

means for securing said second inner hub part to the interior of said first outer hub part; and connection means on said second hub part being adapted to couple said second hub part to drive means, said drive means producing heat and transmitting said heat to said connection means and said second hub part, said first hub part being made in one piece with the fan blades of a thermoplastic material having a low resistance to heat flow, for example polypropylene, and said second hub part carrying fastening lugs integral with it for connection to said drive means and being made of a thermoplastic material having a high resistance to heat flow, such as for example teflon, hostaflon, polyamide, or the like.

2. Fan blade apparatus, comprising:

a first hollow outer hub part having a plurality of fan blades fixed thereto;

a nonmetallic, second inner hub part insertable onto said first hub part;

means for securing said second inner hub part to the interior of said first outer hub part; and connection means on said second hub part being adapted to couple said second hub part to drive means, said drive means produring heat and transmitting said heat to said connection means and said second hub part, said first hub part being made unitary with said fan blades of a thermoplastic material having a low resistance to heat flow, for example polypropylene, polyamide and said second hub part carries fastening lugs integral with it for connection to said drive means and being made together with said fastening lugs of a hardenable non-remeltable plastics material having a high resistance to heat flow, for example a phenoplast, silicone, or the like.

3. Fan blade apparatus, comprising:

a first hollow outer hub part having a plurality of fan blades fixed thereto;

a nonmetallic second inner hub part insertable onto said first hub part;

means for securing said second inner hub part to the interior of said first outer hub part; and connection means on said second hub part being adapted to couple said second hub part to drive means, said drive means producing heat and transmitting said heat to said connection means and said second hub part, said first hub part being made unitary with said fan blades of a thermoplastic material having a low resistance to heat, for example polypropylene, polyamide and said second hub part carrying fastening lugs integral with it for connection to said drive means and being made together with said fastening lugs of a thermosetting plastics material having a high resistance to heat flow, such as bakelite, silicone.

* * * * *

UNITED STATES PATENT OFFICE
CERTIFICATE OF CORRECTION

Patent No. 3 749 519                Dated July 31, 1973

Inventor(s) Anton Ryba

It is certified that error appears in the above-identified patent and that said Letters Patent are hereby corrected as shown below:

Column 3, line 13; cancel "flow".

line 18; cancel "flow".

Column 4, line  2; cancel "flow".

line  8; cancel "flow".

line 30; cancel "flow".

Signed and sealed this 18th day of December 1973.

(SEAL)
Attest:

EDWARD M. FLETCHER, JR.      RENE D. TEGTMEYER
Attesting Officer            Acting Commissioner of Patents